(12) United States Patent
Jackson et al.

(10) Patent No.: US 11,410,180 B2
(45) Date of Patent: Aug. 9, 2022

(54) DATABASE WITH DIMENSIONAL BALANCES UPDATING

(71) Applicant: Stripe, Inc., San Francisco, CA (US)

(72) Inventors: Carl Jackson, San Francisco, CA (US);
Robert Ying, San Francisco, CA (US);
Usman Masood, San Francisco, CA (US)

(73) Assignee: Stripe, Inc., San Francisco, CA (US)

( * ) Notice: Subject to any disclaimer, the term of this patent is extended or adjusted under 35 U.S.C. 154(b) by 134 days.

(21) Appl. No.: 16/912,107

(22) Filed: Jun. 25, 2020

(65) Prior Publication Data

US 2021/0406891 A1 Dec. 30, 2021

(51) Int. Cl.
| | |
|---|---|
| *G06Q 20/40* | (2012.01) |
| *G06F 16/23* | (2019.01) |
| *G06F 16/28* | (2019.01) |
| *G06Q 40/02* | (2012.01) |
| *G06Q 20/10* | (2012.01) |

(Continued)

(52) U.S. Cl.
CPC ....... *G06Q 20/405* (2013.01); *G06F 16/2379* (2019.01); *G06F 16/283* (2019.01); *G06K 7/10366* (2013.01); *G06K 7/1413* (2013.01); *G06K 7/1417* (2013.01); *G06Q 20/108* (2013.01); *G06Q 20/4014* (2013.01); *G06Q 20/4037* (2013.01); *G06Q 40/02* (2013.01); *G06Q 50/06* (2013.01); *G06Q 50/265* (2013.01)

(58) Field of Classification Search
CPC ............... G06Q 20/405; G06Q 20/108; G06Q 20/4014; G06Q 20/4037; G06Q 40/02; G06Q 50/06; G06Q 50/265; G06F 16/2379; G06F 16/283; G06K 7/10366; G06K 7/1413; G06K 7/1417
See application file for complete search history.

(56) References Cited

U.S. PATENT DOCUMENTS

| | | | | |
|---|---|---|---|---|
| 5,924,103 A | * | 7/1999 | Ahmed | ............... G06F 16/2365 |
| 7,117,172 B1 | * | 10/2006 | Black | ..................... G06Q 40/00 |
| | | | | 705/35 |

(Continued)

FOREIGN PATENT DOCUMENTS

| | | | | |
|---|---|---|---|---|
| WO | WO-03003163 A2 | * | 1/2003 | ............. G06Q 30/06 |
| WO | WO-2016141361 A1 | * | 9/2016 | ......... G06F 16/2282 |
| WO | WO-2017069928 A1 | * | 4/2017 | ........... G06F 9/5094 |

OTHER PUBLICATIONS

GreekforGreeks: Attribute Subset Selection in Data Mining, May 1, 2019, pp. 1-5 (Year: 2019).*

(Continued)

*Primary Examiner* — Bijendra K Shrestha
(74) *Attorney, Agent, or Firm* — Schwegman Lundberg & Woessner, P.A.

(57) ABSTRACT

In an example embodiment, a method for updating a database with dimensional balancing comprises receiving a transaction request to transfer a portion of a first balance from the first balance to a second balance; determining a subset of the first balance less than or equal to the portion in the first balance compliant with dimensional rules based on one or more attributes of the subset and an identifier of an account holding the second balance; moving the determined subset from the first balance to the second balance; and updating attributes of the moved subset in the second balance.

22 Claims, 9 Drawing Sheets

(51) Int. Cl.
*G06K 7/14* (2006.01)
*G06Q 50/26* (2012.01)
*G06K 7/10* (2006.01)
*G06Q 50/06* (2012.01)

(56) References Cited

U.S. PATENT DOCUMENTS

| | | | |
|---|---|---|---|
| 8,128,485 B2* | 3/2012 | Vlazny | G06Q 50/34 |
| | | | 463/25 |
| 9,558,478 B2* | 1/2017 | Zhao | G06Q 20/3223 |
| 10,783,576 B1* | 9/2020 | Van Os | G06F 21/31 |
| 2017/0243173 A1* | 8/2017 | Witten | G07F 5/24 |
| 2020/0202316 A1* | 6/2020 | Hu | G06Q 20/381 |

OTHER PUBLICATIONS

Wilkes, Steve: Real-Time Data Is for Much More Than Analytics, Jul. 16, 2019, Forbes, pp. 1-6 (Year: 2019).*

Bank for International Settlements: Basel III: The Liquidity Coverage Ratio and loquidity risk monitoring, Jan. 2013, Basel Committe on Bank Supervision, pp. 1-75. (Year: 2013).*

* cited by examiner

DATABASE WITH DIMENSIONAL BALANCES UPDATING

FIELD

The subject matter disclosed herein generally relates to the technical field of databases and more specifically, databases with dimensional balances updating. The updating enables the transmission of funds, electricity, water, etc. according to a set of dimensional rules.

BACKGROUND

The present subject matter seeks to address technical problems existing in conventional databases. For example, state, national and international regulations govern financial transfers and a payment processor must navigate these regulations by constantly updating a database. However, current databases generally shut down overnight to allow for updating, leading to significant downtown to the database and potential loss of updated information arising while shut down. Further, constraint enforcement is not possible in databases that only do post-hoc reconciliation.

BRIEF SUMMARY

The present disclosure relates generally to a database with dimensional balances updating. Embodiments enable real-time capabilities in databases. That is, embodiments enable a database to answer questions accurately and deny certain impermissible actions (real-time constraint enforcement) based on a completely up-to-date picture of the dimensions. Embodiments further solve the technical problem of database downtime by updating the database in real-time as a transaction occurs instead of blocking access to the database to perform updating and reconciliation overnight.

In some examples, a method for updating a database with dimensional balancing comprises receiving a transaction request to transfer a portion of a first balance from the first balance to a second balance; determining a subset of the first balance less than or equal to the portion in the first balance compliant with dimensional rules based on one or more attributes of the subset and an identifier of an account holding the second balance (the account can be the same account or different account holding the first balance); moving the determined subset from the first balance to the second balance; and updating attributes of the moved subset in the second balance.

A database system having dimensional balance updating can perform the above method. In addition, a non-transitory machine-readable medium comprising instructions which, when read by a machine, can cause the machine to perform operations for updating dimensional balances in a database according to the method.

BRIEF DESCRIPTION OF THE SEVERAL VIEWS OF THE DRAWINGS

Some embodiments are illustrated by way of example and not limitation in the views of the accompanying drawing.

DETAILED DESCRIPTION

Figure 1:
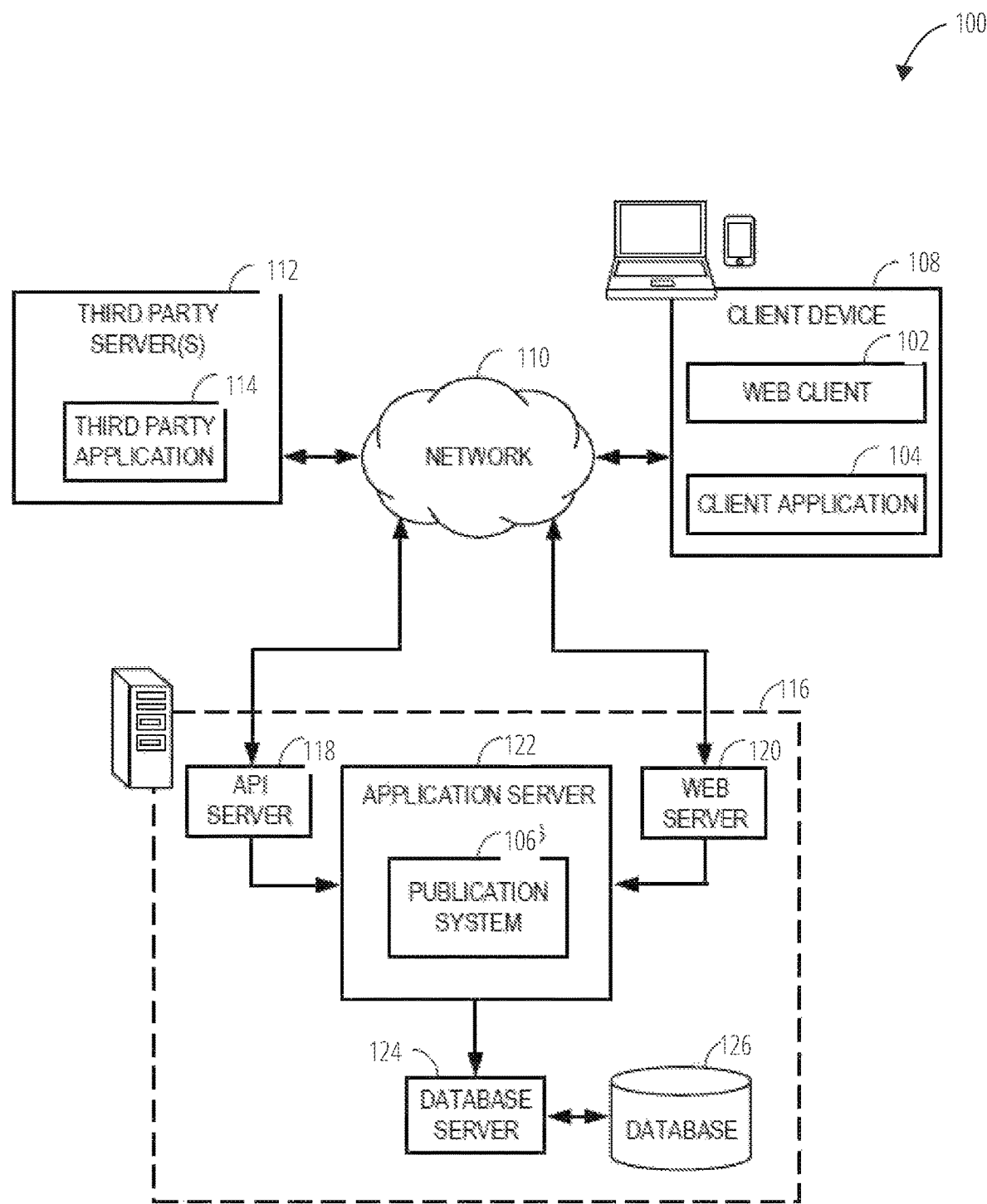
FIG. 1 is a block diagram illustrating a networked system, according to an example embodiment.

"Carrier Signal", in this context, refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device", in this context, refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Customer's Electronic Device" or "Electronic User Device", in this context, refers to a client device that a customer uses to interact with a merchant. Examples of this device include a desktop computer, a laptop computer, a mobile device (e.g., smartphone, tablet), and a game console. The customer's electronic device may interact with the merchant via a browser application that executes on the customer's electronic device or via a native app installed onto the customer's electronic device. The client-side application executes on the customer's electronic device.

"Communications Network", in this context, refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component", in this context, refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor", in one context, refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor may further be a multi-core processor having two or more independent processors (sometimes referred to as "cores") that may execute instructions contemporaneously.

In another context, a "Processor" is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association"), in this context, refers to financial payment networks such as Visa®, MasterCard®, American Express®, Diners Club®, JCB®, and China Union-Pay®.

"Acquiring Bank" or "Acquirer", in this context, refers to a bank or financial institution that accepts credit and/or debit card payments from affiliated card networks for products or services on behalf of a merchant or payment service provider.

"Card Issuing Bank" or "Issuing Bank", in this context, refers to a bank that offers card network or association-branded payment cards directly to consumers. An issuing bank assumes primary liability for the consumer's capacity to pay off debts they incur with their card.

"Payment Information" includes information required to complete a transaction, and the specific type of information provided may vary by payment type. Some payment information will be sensitive (e.g., the card validation code), while other information might not be (e.g., zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant", in this context, refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site", in this context, refers to an e-commerce site or portal (e.g., website, or mobile app) of the merchant. In some figures, the merchant and merchant servers are associated with the merchant site. The merchant site is associated with a client-side application and a server-side application. In one example embodiment, the merchant site includes the merchant servers, and the server-side application executes on the merchant servers.

"Payment Processor", in this context, refers to an entity or a plurality of entities that facilitate a transaction, for example between a merchant and a customer's electronic device. With reference to a high-level description illustrated in FIG. 5, in some examples described more fully below, the payment processor includes selected functionality of both the payment processor and processor/card networks. For example, the payment processor creates tokens and maintains and verifies publishable (non-secret) keys and secret keys. In the illustrated example, the processor 518/card networks are involved in authorizing or validating payment information. In one example embodiment, the payment processor Sand the processor 518/card networks 520 function together to authorize and validate payment information, issue a token, and settle any charges that are made. Accordingly, in this embodiment, "payment processor" refers to the functionality of the payment processor 514 and the functionality of the processor/card networks. In another example embodiment, wherein step (3) in the high-level description is not performed, and the payment processor performs its own verification before issuing a token, the processor/card networks are still used for settling any charges that are made, as described in step (7). Accordingly, in this embodiment, "payment processor" may refer only to the functionality of the payment processor with respect to issuing tokens. Further, in the example arrangement shown, the payment processor, the processor, and the card networks are shown as separate entities. In some examples, their respective functions may be performed by two entities, or even just one entity, with the entities themselves being configured accordingly.

"Native Application" or "native app", in this context, refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which requires interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2019, Stripe, Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. In this specification, the terms "user", "cardholder", and "consumer" are used interchangeably unless the context indicates otherwise.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, Calif. (herein "Stripe") as an example of a payment processor 352 that provides a number of functions and services to the client application 104 that accesses the networked system 116. The client application 104 also provides a number of interfaces described herein, which present output of push payment decision routing to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the programmatic client application 104 and the networked system 116.

Further, while the SaaS network architecture 100 shown in FIG. 1 employs a client-server architecture, the present inventive subject matter is, of course, not limited to such an architecture, and could equally well find application in a distributed, or peer-to-peer, architecture system, for example. The publication system 106 could also be implemented as a standalone software program, which does not necessarily have networking capabilities.

Figure 2:
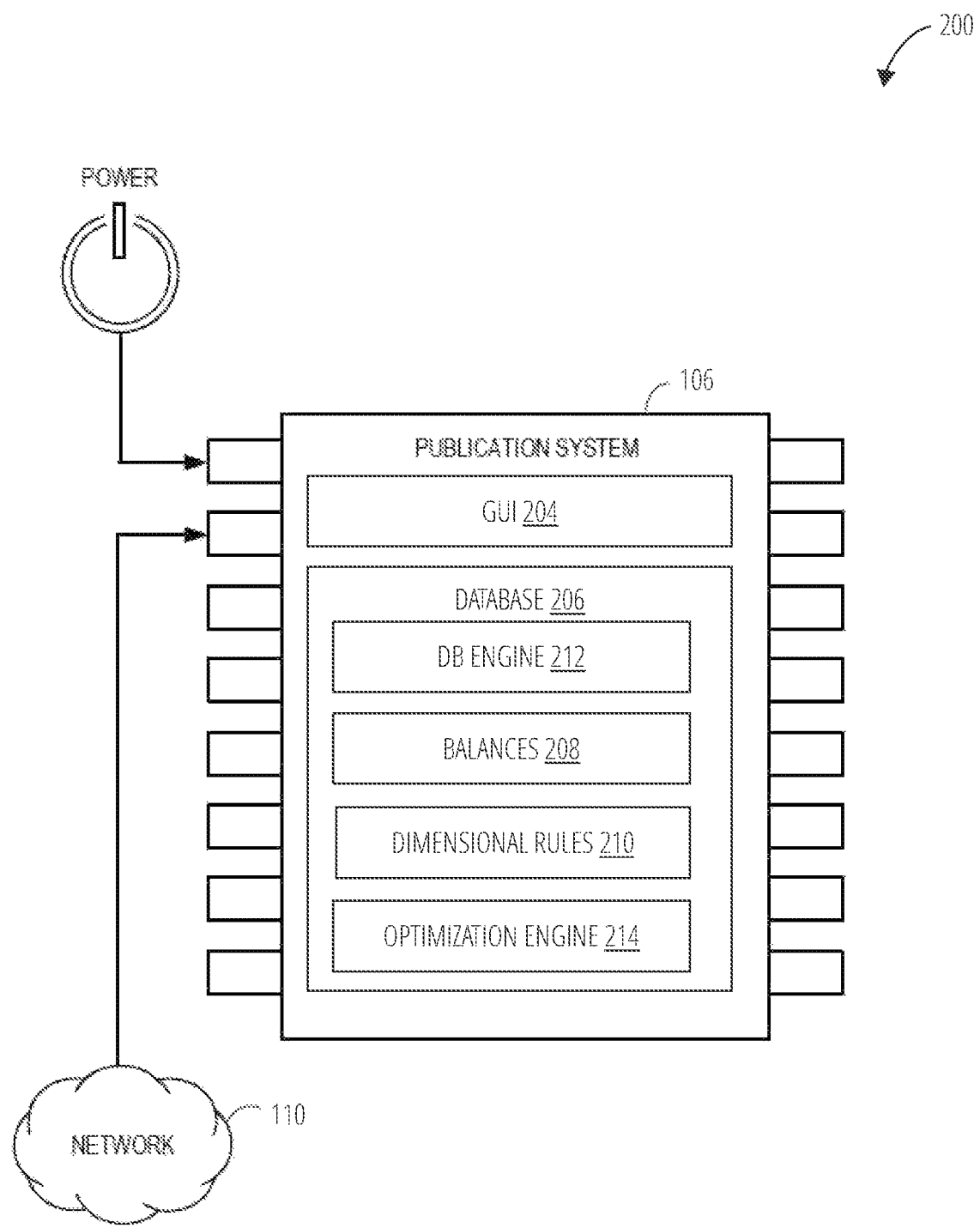
FIG. 2 is a block diagram showing architectural aspects of a database system, according to some example embodiments.

FIG. 2 is a block diagram showing architectural details of a publication system 106, according to some example embodiments. Specifically, the publication system 106 includes an interface component (not shown) by which the publication system 106 communicates (e.g., over a network 110) with other systems within the SaaS network architecture 100. The publication system 106 further includes a graphical user interface GUI 204 and a Database 206 The Database 206 includes a database (DB) DB Engine 212, balances 208, dimensional rules 210 and an optimization engine 214.

The GUI 204 provides an interface for a user to access balances 208 and transfer subsets of the balances 208 from a first account to a second account according to the dimensional rules 210. The GUI 204 also receives and displays results from queries to the balances 208 (e.g., which subset of a balance has a specific attribute). The DB Engine 212 updates the balances 208 according to the transaction, if approved per the dimensional rules 210. The DB Engine 212 can also respond to queries received from the GUI 204. The optimization engine 214 optimizes the movement of subsets of balances in balances 208 when more than one subset would meet dimensional rules 210 as will be discussed further in conjunction with FIG. 6 and FIG. 8.

Balances 208 are referenced using a set of key-value pairs called identifiers. Balances 208 can represent funds subject to different regulatory requirements, waters of various types (e.g., reservoir water, reclaimed water, etc.), electricity of different types (e.g., conventional electricity such as coal-generated electricity; green electricity such as solar or wind generated electricity; and nuclear-generated electricity, etc.), and other transferrable balances (e.g., communication bandwidth). Embodiments provide structure and metadata to fungible goods/commodities (money, water, electricity, grain, bandwidth, cellphone minutes, gasoline, etc.). An account of a user will include a balance in the balances 208 with subsets of the balance representing different sources or requirements (regulatory, financial, etc.). The subsets (e.g., funds) within a balance can be annotated with key-value pairs called attributes. Attributes are automatically swept with the subsets when they move.

An identifier is a set of keys-value pairs which references a unique subset of a balance (e.g., portion of funds) in the balances 208. All balances can be mutually exclusive from each other. Top level keys include:

owner—owner of the balance, e.g. corporate customer, end user, financial partner
account—a merchant,
This may also be a "composite" key, e.g. TestmodeAccount(account, testmode_epoch)
product—a product-specific key-value Each product, in turn, may require additional keys. For example:

account—Bank Account number
currency—currency the balance is denominated in
status—the availability state of the funds An example balance identifier is:
1. merchant: 123456
2. ownertype: corporate customer
3. currency: gbp
4. product: banking
5. account: 7890
6. status: inbound_pending Attributes are keys and may be specified in addition to identifiers. Each attribute is orthogonal to all other attributes. Attributes allow us to label subsets within a balance. When subsets move between balances in the balances 208, the DB Engine 212 ensures that attributes are swept with the subset.

Identifiers and attributes can be analogized to an email system.

A set of identifier key-values (e.g. merchant=123456, ownertype=corporate customer, product=banking, account=7890) maps to a folder. An email message (subset) is contained in exactly one folder (balance).
An attribute key-value (e.g. reserve=risk) maps to a category. Any number of categories can be applied to an email message, and all categories are independent of each other. When an email message is moved between folders, it retains its categories.
Subsets (e.g., funds) map to email messages in a folder. A user can apply filters based on labels to further drill down and find the email messages the user cares about.

In some examples, identifiers and attributes may be analogized to sticky notes. Each attribute is like a colored sticky note attached to a document in a folder. Multiple sticky notes can be attached to each document. If you move a document from one folder to another, the sticky notes come with the document. It's possible to add or remove sticky notes to documents, including as part of the process of moving a document between folders. It's also possible to find documents within a folder or across folders by the color of the attached sticky notes.

Attributes let a user home in on balances, which contain segregated subsets (e.g., "buckets of money"). Within a balance, subsets can be colored using attributes. When moving subsets (funds) between balances, the color of the funds is carried with them. For example, in FIG. 7, a merchant may have three balances in the balances 208. The attributes are indicated by shading. For example, the leftmost balance has two subsets—one with attribute: reserve=risk and a second with two attributes: reserve=risk & reg_status=emoney. There is no limit to subsets in a balance, nor attributes that can be applied to a subset.

Identifiers limit the need to manage high-cardinality dimensions. Embodiments providing a split key-space of identifiers and attributes allows explicit boundaries between balances while maintaining ability to safely move subsets (e.g., money) across these boundaries.

Attributes can be used to track availability of funds. If there are pending funds sitting in a merchant's Payments balance and the DB Engine 212 moves them to the merchant's Banking balance, the moved funds shouldn't suddenly become available to the merchant. Otherwise, the merchant could simply start stealing money from a payment processor by programmatically moving unavailable funds from their Payments balance to their Banking balance. Other attribute may include reserve attributes—risk or connect platform.

Funds availability (pending attribute) works as follows:
For Payments, there are three different semantics in an embodiment:

For some users, Charges are pending between the time they are created and the time those funds are deposited into their external bank account (let's call these the "auto semantics"). The DB Engine 212 commits to a timeline up front to release funds.
For some users, Charges are pending between the time they are created and the a payment processor allows those users to use those funds (the "manual semantics"). The DB Engine 212 commits to a timeline up front to release funds.
For some payment methods with untrustworthy authorization/settlement behavior, Charges are pending between the time they are created and the moment they are considered trustworthy (the "untrusted semantics"). The DB Engine 212 doesn't commit to a timeline for releasing the funds.

For Payments, the DB Engine 212 also has to support the following use cases:

Certain operations, like Instant Payouts, can be funded from the pending balance, instead of the available balance as usual, but only if those funds are trustworthy.
Connect platforms want to assign pending funds to a connected account prior to them becoming available.

For Banking, the DB Engine 212 uses different semantics:
Incoming funds are pending until some event occurs, explicitly making them available
Outgoing funds are pending until some event occurs, explicitly decrementing the balance
The incoming-pending and outgoing-pending balances are different
Pending funds are tied to a single account, and cannot be manipulated For Corporate Card and Issuing, the DB Engine 212 uses different semantics:
Charges are pending until some event occurs, explicitly adding them to the card statement
Pending funds are tied to a single card program, and cannot be manipulated For the Payments balance, pending attribute can be adjusted as follows.

A balance with a deposit attribute that can take on a date value, e.g., deposit=2020-03-29. This indicates the funds are currently pending, and will be part of the deposit that occurs on the given date.
A balance with a pending attribute that can take on a date value, e.g., pending=2020-03-29. This indicates the funds are currently pending, but will become available on the given date. When that date passes, the DB Engine 212 will remove the pending attribute.

A balance that holds untrusted funds—All funds in this balance are considered pending. When these funds become available, they are swept to an appropriate deposit balance in the "auto semantics" balance, or the available funds of the "manual semantics" balance, depending on user configuration.

In an example, a customer uses ACH debit to make a purchase from a merchant that uses automatic payouts:

T0—a customer makes a $1,000 payment to a merchant using ACH debit. Because the ACH is an "ask-for-forgiveness" network, we have no indication at this time as to whether the payment is authorized, or when the funds will arrive.

+$1000 product=payments/untrusted

T1—Payment Processor's bank confirms that the money has landed in Payment Processor's bank account, but we still do not have any indication from the customer's bank about whether the payment was authorized.

T2—Payment Processor has high confidence that, were the transaction not authorized, the customer's bank would have informed us by now. We include the funds in the merchant's next automatic deposit:

−$1000 product=payments/untrusted
+$1000 product=payments/auto deposit=T4

T3—, query the balance of product=payments/auto deposit=T4, and makes a payout for $1,000

−$1000 product=payments/auto deposit=T4

T4—funds from the ACH payment arrive in the merchant's external Payment Processor's account In a second example, a customer uses a credit card to make a purchase from a user of a Connect marketplace that uses separate charges-and-transfers:

T0—a customer makes a $10 charge, which is processed by a Connect marketplace

+$10 merchant=platform product=payments/manual pending=T2

T1—the marketplace app allocates those funds to a connected account by making a Transfer specifying the charge as the source transaction −$10 merchant=platform product=payments/manual pending=T2
+$10 merchant=connected product=payments/manual pending=T2

T2—the funds become available. An automatic process removes the pending attribute −$10 merchant=connected product=payments/manual pending=T2
+$10 merchant=connected product=payments/manual In an embodiment, the pending attribute can have three different states: inbound_pending, available, outbound_pending.

The database 206 can comprise three tables in an embodiment that are managed by the DB Engine 212. The interface data model revolves around transactions containing double-entries. In the storage data model, embodiments explode an n-double-entry Transaction into 2n atomically-written rows in a single-entry table:

| Column Name | Description |
| --- | --- |
| shard_key | A key representing the major sharding axis of the system. Transactions that only manipulate a single shard commit atomically; transactions that span shards will commit atomically on one shard, and will asynchronously propagate to other shards |
| effective_time | The moment in time this entry became effective |
| transaction_id | A unique identifier for the transaction this single-entry was part of |
| dimensions | A map from strings to strings that identifies a specific balance |
| amount | A single-currency amount to add to the balance indicated by the above dimensions |

The above single-entry table can be used for point lookups on specific transaction IDs, as well as to perform cursor scans of transactions affecting specific balances. In order to facilitate particularly hot queries, sub-fields of the dimensions column may be indexed.

A balances table is a secondary view over canonical data represented in the single entry table, storing the current balance of the balance described by every set of dimensions. In particular, using SQL syntax for clarity, it can be thought of as a materialized view that is the result of performing the following query:

1 select shard_key, dimensions, sum(amount) as balance
2 from table1
3 group by 1, 2

In an embodiment, the balances table can take the following form:

| Column Name | Description |
| --- | --- |
| shard_key | A key representing the major sharding axis of the system, as above |
| dimensions | A map from strings to strings that identifies a specific balance |
| balance | The current balance (e.g., the sum from the start of time to now of all single-entries referencing the above balance). This is potentially a multi-currency amount (a plurality of balances - one for each currency). |

The balances tables can be used for point lookups on specific balances, and can be used to sum over balances in the service of selectors that only require scanning hundreds of rows. In order to facilitate particularly hot queries, sub-fields of the dimensions column may be indexed.

A pre-aggregated balances table (also referred to as a dimension balance table) is a secondary view over data represented in the balance table (which itself is a secondary view of the single entry table). The pre-aggregated balances table can be a set of tables, one per pre-aggregation performed. Each of these pre-aggregations can be thought of as a materialized view that is the result of performing the following query (again, using SQL syntax for clarity):

1. select shard_key, axis1, axis2, sum(balance) as balance
2. from table2
3. group by 1, 2, 3, . . .

| Column Name | Description |
| --- | --- |
| shard_key | A key representing the major sharding axis of the system, as above |
| [axis1] | A string representing the value of projecting an axis from a set of dimensions |

| Column Name | Description |
|---|---|
| [axis2] [. . .] | A string representing the value of projecting a second axis |
| balance | The current balance (e.g., the sum from the start of time to now of all single-entries referencing the above balance). This is potentially a multi-currency amount (a plurality of balances - one for each currency). |

The pre-aggregated balances table can be created to serve any query for which a corresponding query over the balances table scans too many rows. As mentioned above, the DB Engine 212 makes any number of tables in the spirit of Table 3, one per query pattern. Just like balances table and single-entry table, indexes can be built on Table 3 to facilitate query patterns.

Figure 9:
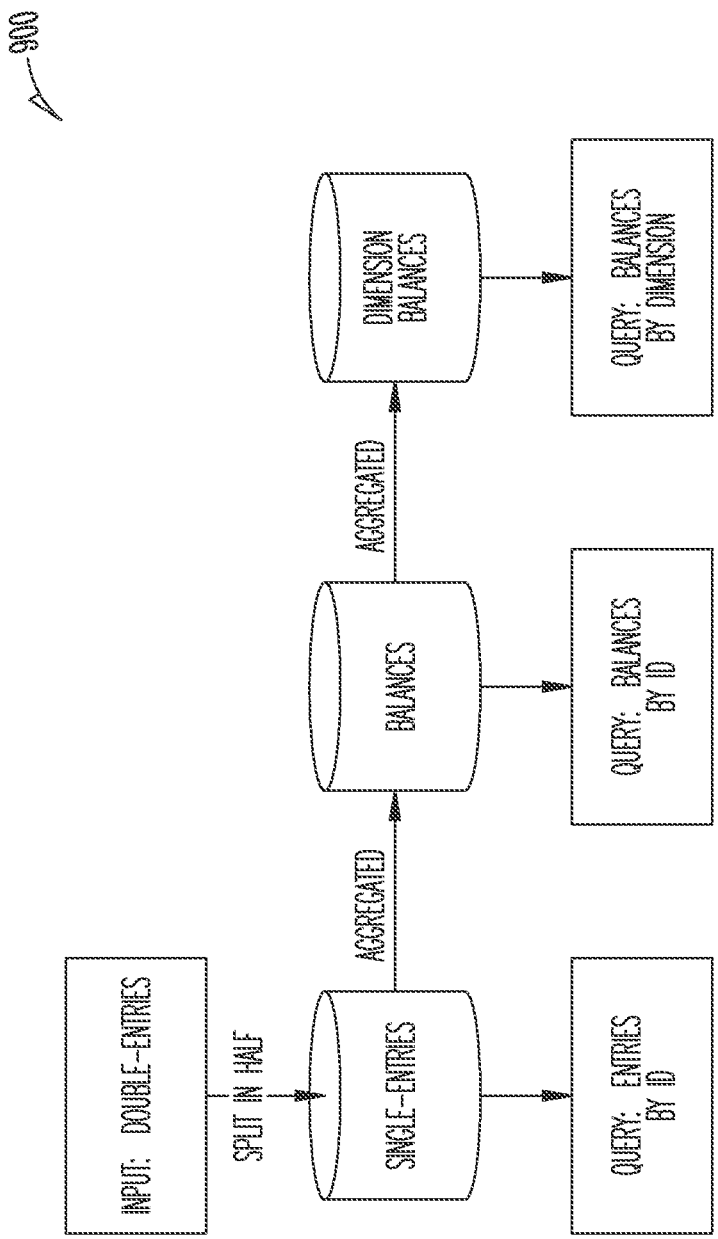
FIG. 9 is a flow diagram showing queries of a database with dimensional balances.

These tables can be seen from another perspective in FIG. 9. Double entries are input and converted/stored as single entries. The single entries are aggregated into balances, which is aggregated into dimension balances. Different queries can be performed on different tables: query entry by ID on the single-entry table; query balance by ID on pre-aggregated balances table (dimensional balance table). Note that other queries can be performed than those listed herein.

Figure 3:
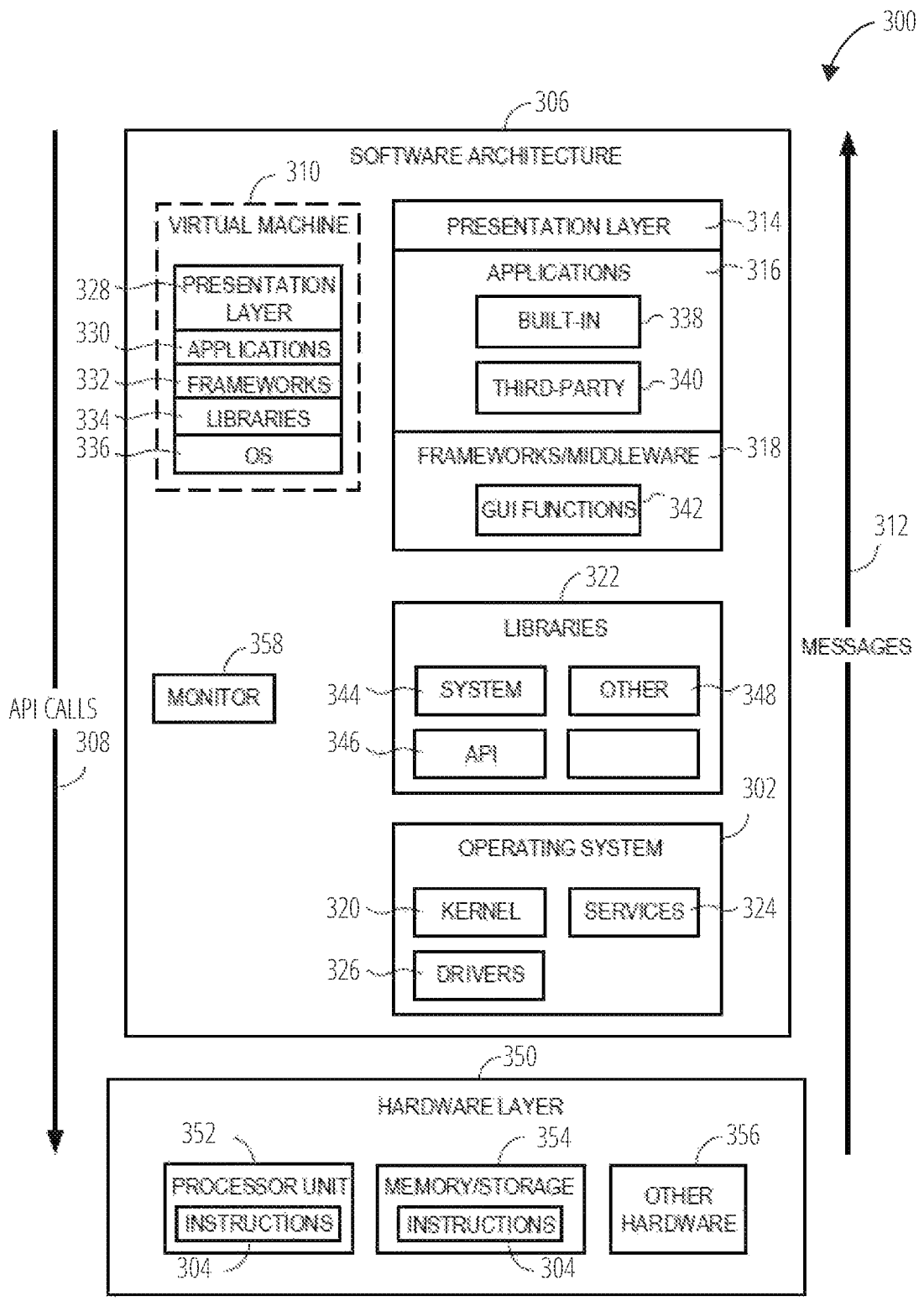
FIG. 3 is a block diagram illustrating a representative software architecture, which may be used in conjunction with various hardware architectures herein described

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 350 is illustrated and can represent, for example, the machine 400 of FIG. 4. The representative hardware layer 350 includes a processor 352 having associated executable instructions 304. The executable instructions 304 represent the executable instructions of the software architecture 306, including implementation of the methods, components, and so forth described herein. The hardware layer 350 also includes memory and/or storage modules as memory/storage 354, which also have the executable instructions 304. The hardware layer 350 may also comprise other hardware 356.

In the example architecture of FIG. 3, the software architecture 306 may be conceptualized as a stack of layers where each layer provides particular functionality. For example, the software architecture 306 may include layers such as an operating system 302, libraries 322, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 320, services 324, and drivers 326. The kernel 320 may act as an abstraction layer between the hardware and the other software layers. For example, the kernel 320 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 322 provide a common infrastructure that is used by the applications 316 and/or other components and/or layers. The libraries 322 provide functionality that allows other software components to perform tasks in an easier fashion than by interfacing directly with the underlying operating system 302 functionality (e.g., kernel 320, services 324, and/or drivers 326). The libraries 322 may include system libraries 344 (e.g., C standard library) that may provide functions such as memory allocation functions, string manipulation functions, mathematical functions, and the like. In addition, the libraries 322 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 322 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system 302 or platform.

The applications 316 include built in applications 338 and/or third-party applications 340. Examples of representative built in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™ ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 320, services 324, and/or drivers 326), libraries 322, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 358, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
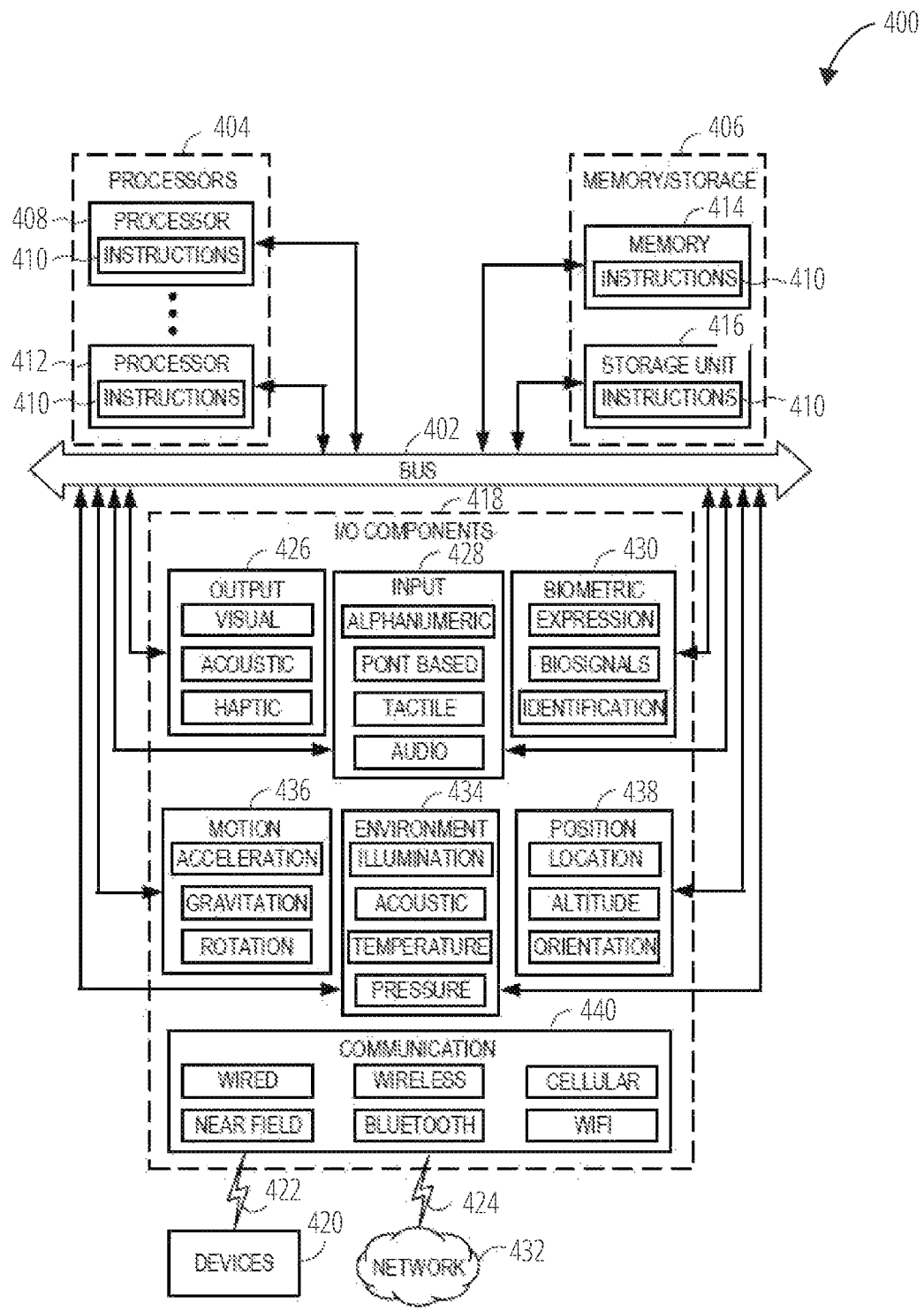
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions 304 from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processor 408 and processor 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402.

The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine 400 will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 436, environment components 434, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 436 may include acceleration sensor components (e.g., accelerometer), gravitation sensor components, rotation sensor components (e.g., gyroscope), and so forth. The environment components 434 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Figure 5:
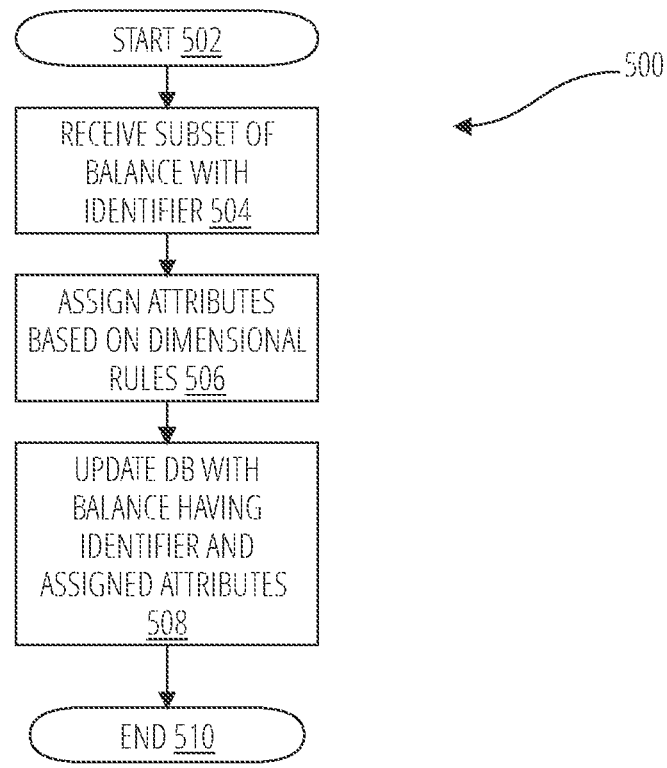
FIG. 5 is a flow chart illustrating a method for storing data in a database having attributes based on dimensional rules, according to an example embodiment.

FIG. 5 is a flow chart illustrating a method 500 for storing data in a database having attributes based on dimensional rules, according to an example embodiment. Initially, the DB Engine 212 receives (block 504) a subset of a balance with a balance identifier. The DB Engine 212 then assigns (block 506) attributes to the subset based on the dimensional rules 210. The DB Engine 212 then updates (block 508) the database 206 (e.g., the tables discussed in conjunction with FIG. 2) the balance identified by the identifier with the received subset and assigned attributes. The method 500 then ends.

Figure 6:
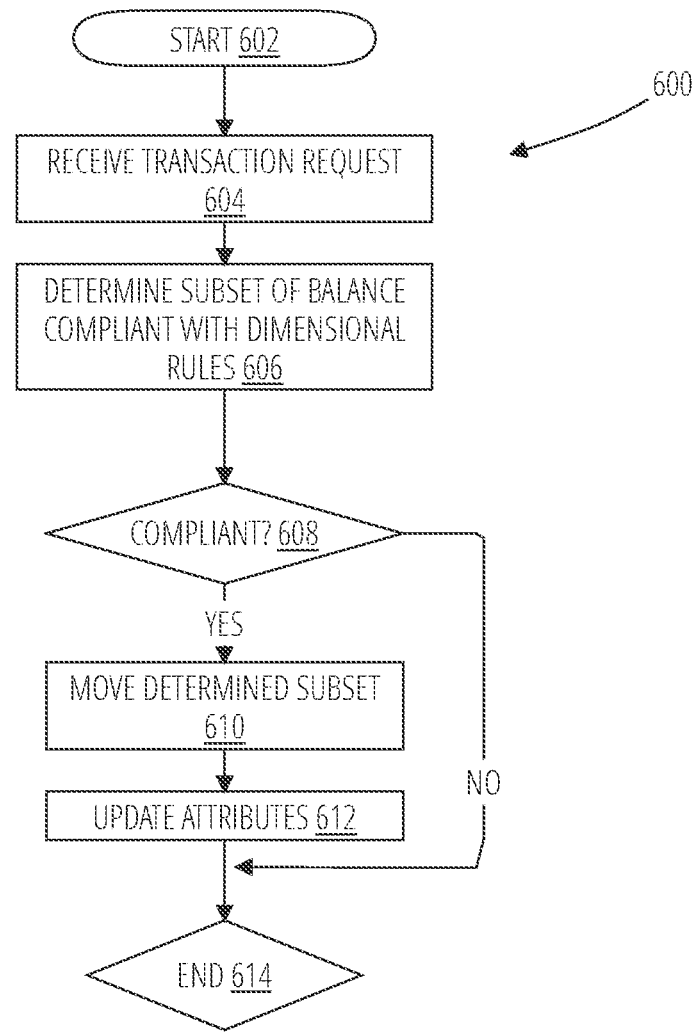
FIG. 6 is a flow chart illustrating a method for updating a database after a transaction in accordance with one embodiment.

FIG. 6 is a flow chart illustrating a method 600 for updating a database after a transaction in accordance with one embodiment. The method 600 may be executed by the DB Engine 212 and/or the optimization engine 214. First, a transaction request is received (block 604) requesting a portion of a first balance be moved from the first balance to a second balance in the balances 208. Next, a first subset of the first balance less than or equal to the portion in the first account compliant with the dimensional rules 210 based on one or more attributes of the subset and identifier of an account holding the second balance is determined (block 606). If (decision block 608) no subset is identified, the method 600 ends. Otherwise, if (decision block 608) the determined first subset is moved (610) from the first balance to the second balance. The attributes are swept or updated as needed after the moving (block 612) so that the determined first subset retains the attributes it had in the first balance. The method 600 then ends.

If the first subset is less than the requested portion, then the method 600 can repeat by determining a second subset of the first balance compliant with the set of dimensional rules based on attributes of the second subset and the identifier of the account holding the second balance; moving the determined second subset from the first balance to the second balance; and updating attributes of the second subset in the second balance. The dimensional rules 210 can also include tiered attributes for moving a determined subset based on priority. That is, the method 600 can first determine (block 606) if multiple subsets are compliant with the dimensional rules 210 and then move one or more of the determined subsets based on tiered priority. For example, a compliant subset having an attribute of same jurisdiction between first and second balances would be moved before a compliant subset with different jurisdiction. Similarly, this could apply for currency differences for example. In another example, optimization of cost (reducing cost) can also be a factor. Transfers between some jurisdictions may be more expensive than others and if two subsets are compliant, the subset with lowest cost can be moved.

In an embodiment, the attributes include reclaimed water and the method 600 further comprises transferring reclaimed water, in the amount of the first determined subset, to an end user. In an embodiment, the attributes include green electricity and the method 600 further comprises transferring green electricity, in the amount of the determined first subset, to an end user.

In an embodiment, the attributes include jurisdiction and pending status. In an embodiment, the determining (block 606) includes determining if the subset has a pending status of available and a matching jurisdiction between the first and second balances.

In an embodiment, one of the one or more attributes is time-dependent and the method 600 further comprises updating, before the determining (block 606), the one time-dependent attribute.

Figure 7:
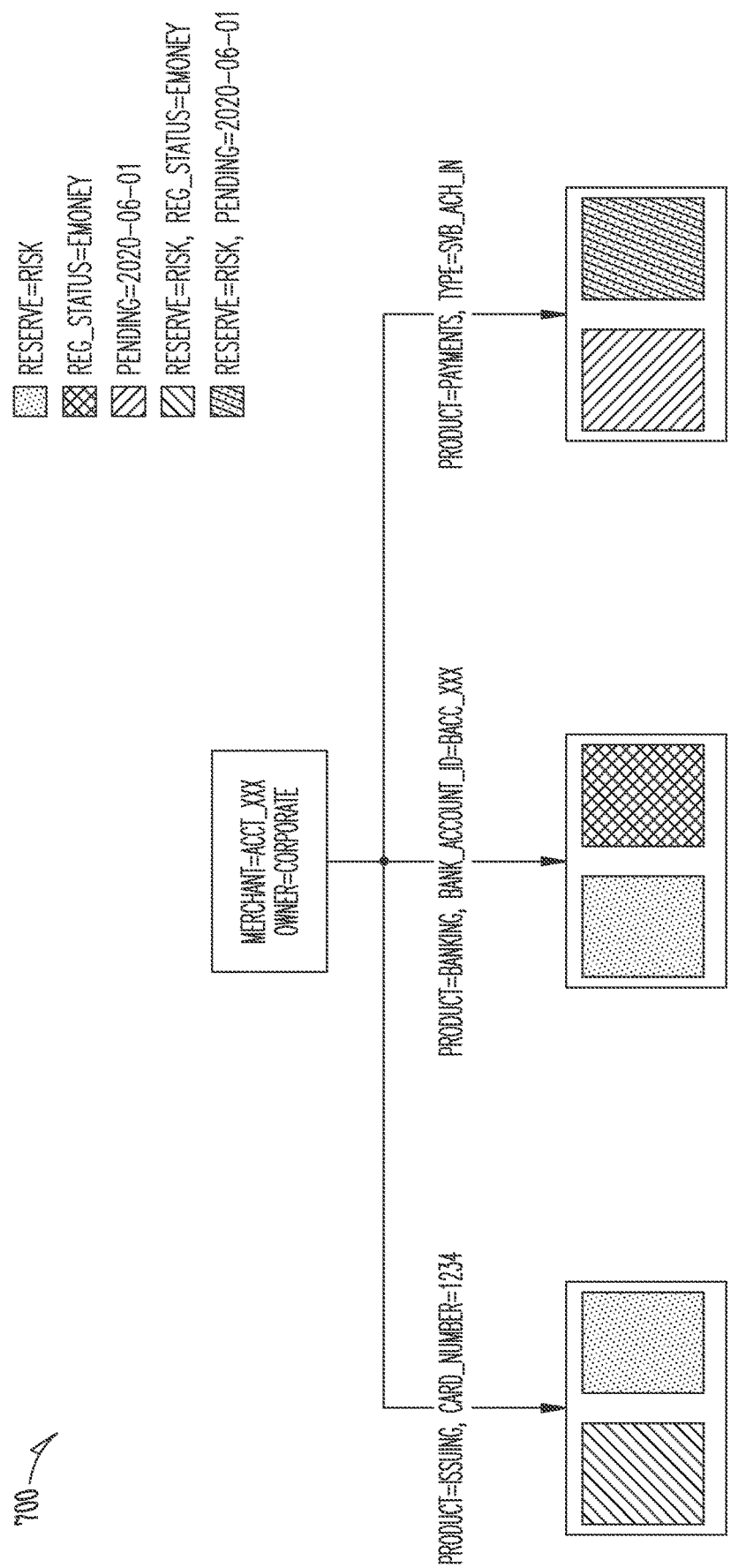
FIG. 7 is a diagram showing an example of a plurality of balances.

FIG. 7 is a diagram showing an example of a plurality of balances. A single merchant account can have several balances 208. Each balance contains subsets with different attributes. In this example, a single account is show with 3 balances. Each balance contains 2 subsets having different attributes. One of ordinary skill in the art will appreciate that each account may contain fewer or additional balances and each balance can have fewer or additional subsets. Each subset can have one or more attributes and while a maximum of two is shown, additional attributes can be assigned. During operation of the method 500, the DB Engine 212 updates attributes of subsets as funds are received. Attributes can only be time-dependent, such as pending, which specifies when a pending fund will convert to available funds. In addition, subsets in different balances can share attributes and/or have different/additional attributes.

Figure 8:
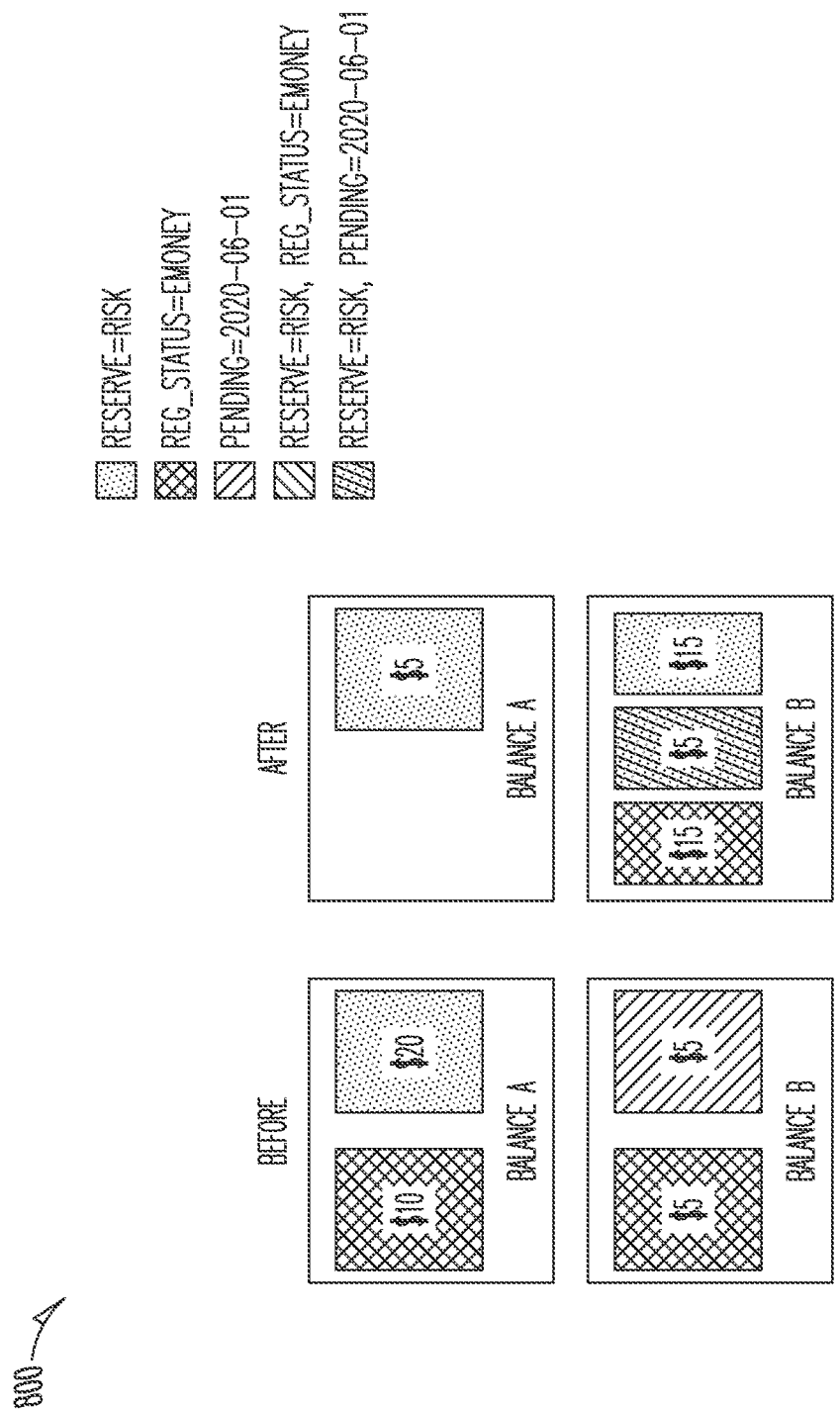
FIG. 8 is a flow diagram showing an example transaction.

FIG. 8 is a flow diagram showing an example transaction 800. In this transaction 800, the DB Engine 212 moves $25 from Balance A to Balance B. $10 from Balance A has an attribute of reg_status=emoney and when moved to Balance B joins a subset having the same attribute, yielding a combined subset of $15 with attribute reg_status=emoney. In addition, $15 of a $20 subset of the Balance A is moved to Balance B having an attribute reserve=risk. As Balance B does not have a subset with that attribute, a new subset is created in Balance B. That is, a moved subset retains its attributes. While the example transaction 800 makes reference to funds, it can equally apply to other objects including those that are fungible such as electricity or water. Movement between balances can include the movement or allocation of tangible objects to comply with user or regulatory requirements. For example, a user may require reclaimed water for gardening purposes and the DB Engine 212 will allocate the reclaimed water from a supplier to a user in the database 206 and cause the physical transfer of the same water. In another example, the movement updates an allocation of bandwidth, providing a user with more bandwidth.

Some embodiments include machine-readable media including instructions 410 which, when read by a machine 400, cause the machine 400 to perform the operations of any one or more of the methodologies summarized above, or described elsewhere herein.

Although the subject matter has been described with reference to specific example embodiments, it will be evident that various modifications and changes may be made to these embodiments without departing from the broader scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of real-time updating a database with dimensional balancing, the method comprising:
   receiving, by a database engine of a payment processor, a subset of a balance with an identifier from an account of a user;
   assigning and storing, by the database engine, an attribute to the subset of the balance based on a dimensional rule, where the dimensional rule includes tiered attributes for moving a determined subset based on priority and the attributes are automatically swept with the subsets when they move;
   accessing, by a client device, the balances via a user interface of a publication system of the payment processor,
   receiving, by the payment processor, from the client device via a user interface, a transaction request to transfer a portion of a first balance from the first balance to a second balance in the database;
   determining, by the payment processor, a subset of the first balance less than or equal to the portion in the first balance compliant with dimensional rules based on one or more attributes of the subset and an identifier of an account holding the second balance, the one or more attributes being orthogonal to each other, the dimensional rules including priority to subset with attributes of same jurisdiction of the subset of the first balance and the second balance over compliant subset with different jurisdiction, priority to subset with attributes of same currency of the subset of the first balance and the second balance over complaint subset over different currencies; and minimization of cost for transferring between jurisdiction of the subset of the first balance to the second balance if subset are compliant;
   optimizing the moving, by the payment processor based on the dimensional rules, the determined subset from the first balance to the second balance;
   updating in real-time, by the payment processor, attributes of the moved subset in the second balance, where a new subset with attribute is automatically created when the moved subset in the second balance attribute does not have attribute of subset of the first balance; and
   causing display, with the user interface on a display of the client device, the first and second balances with the updated attributes after the moving.

2. The method of claim 1, wherein the subset is less in amount than the portion and the method further comprises:
   determining a second subset of the first balance compliant with the dimensional rules based on attributes of the second subset and the identifier of the account;
   moving the determined second subset from the first balance to the second balance; and
   updating attributes of the second subset in the second balance.

3. The method of claim 1, wherein the attributes include reclaimed water and the method further comprises transferring reclaimed water in an amount of the subset to an end user.

4. The method of claim 1, wherein the attributes include green electricity and the method further comprises transferring green electricity in an amount of the subset to an end user.

5. The method of claim 1, wherein the attributes include jurisdiction and pending status.

6. The method of claim 5, wherein the determining includes determining if the subset has a pending status of available and a matching jurisdiction between the first and second balances.

7. The method of claim 1, wherein the dimensional rules include tiered attributes for priority movement, wherein the determining is repeated before the moving to identify a plurality of subsets compliant with the dimensional rules, and wherein the moving moves a determined subset from the plurality based on the tiered attributes.

8. The method of claim 1, wherein one of the one or more attributes is time-dependent and the method further comprises updating, before the determining, the one time-dependent attribute.

9. A database system having real-time dimensional balance updating, the system comprising:
   one or more hardware processors including a payment processor; and a memory storing instructions that, when executed by at least one processor among the processors, cause the system to perform operations comprising, at least:

receiving, by a database engine of the payment processor, a subset of a balance with an identifier from an account of a user;

assigning and storing, by the database engine, an attribute to the subset of the balance based on a dimensional rule, where the dimensional rule includes tiered attributes for moving a determined subset based on priority and the attributes are automatically swept with the subsets when they move;

providing access, to a client device, the balances via a user interface of a publication system of the payment processor, receiving, by the payment processor from the client device via the user interface, a transaction request to transfer a portion of a first balance from the first balance to a second balance in the database;

determining, by the payment processor, a subset of the first balance less than or equal to the portion in the first balance compliant with dimensional rules based on one or more attributes of the subset and an identifier of an account holding the second balance, the one or more attributes being orthogonal to each other, the dimensional rules including priority to subset with attributes of same jurisdiction of the subset of the first balance and the second balance over compliant subset with different jurisdiction, priority to subset with attributes of same currency of the subset of the first balance and the second balance over complaint subset over different currencies; and minimization of cost for transferring between jurisdiction of the subset of the first balance to the second balance if subset are compliant;

optimizing the moving, by the payment processor based on the dimensional rules, the determined subset from the first balance to the second balance;

updating in real-time, by the payment processor, attributes of the moved subset in the second balance, where a new subset with attribute is automatically created when the moved subset in the second balance attribute does not have attribute of subset of the first balance; and causing display, with the user interface on a display of the client device, the first and second balances with the updated attributes after the moving.

10. The system of claim 9, wherein the subset is less in amount than the portion and the operations further comprise:

determining a second subset of the first balance compliant with the dimensional rules based on attributes of the second subset and the identifier of the account;

moving the determined second subset from the first balance to the second balance; and updating attributes of the second subset in the second balance.

11. The system of claim 9, wherein the attributes include reclaimed water and the operations further comprises transferring reclaimed water in an amount of the subset to an end user.

12. The system of claim 9, wherein the attributes include green electricity and the operations further comprises transferring green electricity in an amount of the subset to an end user.

13. The system of claim 9, wherein the attributes include jurisdiction and pending status.

14. The system of claim 13, wherein the determining includes determining if the subset has a pending status of available and a matching jurisdiction between the first and second balances.

15. The system of claim 9, wherein the dimensional rules include tiered attributes for priority movement, wherein the determining is repeated before the moving to identify a plurality of subsets compliant with the dimensional rules, and wherein the moving moves a determined subset from the plurality based on the tiered attributes.

16. A non-transitory machine-readable medium comprising instructions which, when read by a machine, cause a payment processor of the machine to perform operations for real-time updating dimensional balances in a database, the operations comprising, at least:

receiving, by a database engine of a payment processor, a subset of a balance with an identifier from an account of a user;

assigning and storing, by the database engine, an attribute to the subset of the balance based on a dimensional rule, where the dimensional rule includes tiered attributes for moving a determined subset based on priority and the attributes are automatically swept with the subsets when they move;

providing access, to a client device, the balances via a user interface of a publication system of the payment processor, receiving, by the payment processor from the client device via the user interface a transaction request to transfer a portion of a first balance from the first balance to a second balance in the database;

determining, by the payment processor, a subset of the first balance less than or equal to the portion in the first balance compliant with dimensional rules based on one or more attributes of the subset and an identifier of an account holding the second balance, the one or more attributes being orthogonal to each other, the dimensional rules including priority to subset with attributes of same jurisdiction of the subset of the first balance and the second balance over compliant subset with different jurisdiction, priority to subset with attributes of same currency of the subset of the first balance and the second balance over complaint subset over different currencies; and minimization of cost for transferring between jurisdiction of the subset of the first balance to the second balance if subset are compliant;

optimizing the moving, by the payment processor based on the dimensional rules, the determined subset from the first balance to the second balance;

updating in real-time, by the payment processor, attributes of the moved subset in the second balance, where a new subset with attribute is automatically created when the moved subset in the second balance attribute does not have attribute of subset of the first balance; and causing display, with a graphical user interface on a display of the client device, the first and second balances with the updated attributes after the moving.

17. The non-transitory machine-readable medium of claim 16, wherein the subset is less in amount than the portion and the operations further comprise:

determining a second subset of the first balance compliant with the dimensional rules based on attributes of the second subset and the identifier of the account;

moving the determined second subset from the first balance to the second balance; and updating attributes of the second subset in the second balance.

18. The non-transitory machine-readable medium of claim 16, wherein the attributes include reclaimed water and the operations further comprises transferring reclaimed water in an amount of the subset to an end user.

19. The non-transitory machine-readable medium of claim 16, wherein the attributes include green electricity and the operations further comprises transferring green electricity in an amount of the subset to an end user.

20. The non-transitory machine-readable medium of claim 16, wherein the attributes include jurisdiction and pending status.

21. The non-transitory machine-readable medium of claim 20, wherein the determining includes determining if the subset has a pending status of available and a matching jurisdiction between the first and second balances.

22. The non-transitory machine-readable medium of claim 16, wherein the dimensional rules include tiered attributes for priority movement, wherein the determining is repeated before the moving to identify a plurality of subsets compliant with the dimensional rules, and wherein the moving moves a determined subset from the plurality based on the tiered attributes.

\* \* \* \* \*